Figure 1:
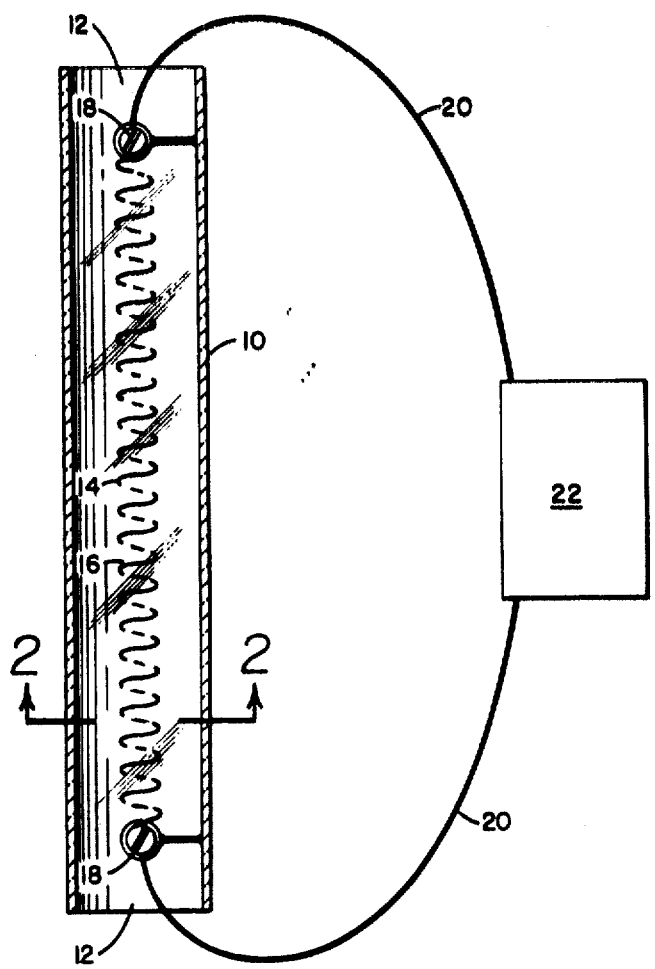

United States Patent
Gant

[15] 3,693,323
[45] Sept. 26, 1972

[54] PROCESS FOR THE TRAPPING OF MERCURY VAPORS AND APPARATUS THEREFOR

[72] Inventor: Preston L. Gant, Ponca City, Okla. 74601

[73] Assignee: Continental Oil Company, Ponca City, Okla.

[22] Filed: Dec. 30, 1970

[21] Appl. No.: 102,571

[52] U.S. Cl. ..........................55/72, 55/74, 55/208, 55/387
[51] Int. Cl. .............................B01d 53/04
[58] Field of Search ......55/72, 74, 208, 387; 23/232; 250/43.5, 47, 218

[56] References Cited

UNITED STATES PATENTS

| | | |
|---|---|---|
| 3,568,411 | 3/1971 | Dravnieks et al............55/208 |
| 3,608,273 | 9/1971 | Fabuss et al. ............55/208 X |
| 3,193,987 | 7/1965 | Manes et al. ...................55/72 |
| 1,711,742 | 5/1929 | Nordlander.............23/232 X |
| 2,345,090 | 3/1944 | Brace ..........................23/232 |
| 3,232,033 | 2/1966 | Williston et al..............55/387 |
| 3,374,608 | 3/1968 | Manes ..........................55/72 |

Primary Examiner—John Adee
Attorney—Joseph C. Kotarski, Henry H. Huth, Robert B. Coleman, Jr. and Ronnie D. Wilson

[57] ABSTRACT

An improved process and apparatus for the collection of mercury vapors from a volume of air or other gases. The improvement comprises the direct resistance heating of a noble-metal absorbent in a mercury trap to release absorbed mercury for the subsequent measurement thereof.

6 Claims, 2 Drawing Figures

PATENTED SEP 26 1972　　　　　　　　　3,693,323

INVENTOR.
PRESTON L. GANT

BY Ronnie D. Wilson

ATTORNEY

PROCESS FOR THE TRAPPING OF MERCURY VAPORS AND APPARATUS THEREFOR

This invention relates to an improved process and apparatus for the collection of mercury vapors present in a volume of air or other gases for the subsequent measurement thereof. More particularly the present invention relates to an improved process and apparatus which employs a noble-metal plated resistance wire as the absorbent therein which is heated by direct resistance heating.

Many varied techniques and apparatus have been disclosed previously for the collection of mercury vapors present in a volume of air or other gases. Some of the principle mercury traps disclosed previously are those disclosed in U.S. Pat. Nos. 3,232,033; 3,281,596; 3,173,016; 3,178,572; 3,193,987; 3,374,608; 1,711,742; and 2,345,090. Also, disclosed in the above mentioned patents are various absorbent materials for the collection of mercury thereon. The principle absorbent materials disclosed therein include highly porous glass wool fibers coated with pure gold or silver; nickel wool fibers coated with gold, silver or other mercury-wettable metals; and activated carbon impregnated with metals which will amalgamate with mercury; for example, silver, copper and other metals which are not easily oxidized.

Probably the most prominent method that has been used previously for the trapping of mercury from a volume of air or gases is the use of silver screens as the absorbent material with the subsequent transfer of said screens to a radio frequency induction heater coil and quickly heating the surface and sweeping the released surface mercury into an atomic adsorption cell, for the measurement thereof. It is also known that gold or silver foils in cylindrical tubes have been used for the trapping of mercury.

The mercury collected by the various methods is normally measured by the adsorption of the 2,537 A. (mercury resonance line) light—and quantized by calibration with known injections of mercury vapor.

A variety of problems have arisen in the employment of the methods and materials previously used in the art. Silver screens are often rendered inactive in areas of copper mineralization by surface contamination. Both gold and silver foils are soft and malleable and with significant vibration, which is found in vehicular or airborne type operations, tend to pack and consequently change trapping and heating efficiency. Further, they trap poorly at high velocities and must be calibrated often. Reproducibility is a general problem with all of the previous methods and many contaminate on setting and are difficult to reactivate. A simple, reproducible inexpensive mercury trap was needed as well as a method which would get away from the heavy induction furnaces which take lots of power and are very inefficient.

Therefore, it is an object of the present invention to provide the art with a simple, efficient, reproducible trap for mercury vapor.

Another object of the present invention is to provide the art with an improved process for the trapping of mercury vapor in a volume of air or gases.

A further object is to provide the art with a rapid method for desorption of trapped mercury for subsequent measurement.

Another object is to provide the art with an improved method for collection of mercury for the subsequent measurement thereof which requires only a small amount of power for the desorption of the collected mercury on the absorbent material which allows for the use thereof in a light aircraft.

These and other objects of the present invention will become apparent from a reading of the following detailed description taken in connection with the accompanying drawing.

It has now been found that the objects of the present invention can be attained by employing, in a process for collecting and measuring the amount of mercury vapor present in a volume of gases with a mercury trap having a noble-metal absorbent wherein a volume of gas is passed through the trap and the mercury vapor present therein is absorbed by the noble-metal and heat is subsequently applied to said noble-metal to desorb the collected mercury for measurement, direct resistance heating of the noble-metal absorbent for the release of the trapped mercury for measurement thereof.

Turning to the drawing,

FIG. 1 is a perspective view of one embodiment of the apparatus of the invention suitable for employing the improved process described herein.

Figure 2:
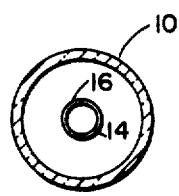

FIG. 2 is a sectional view taken along line 2—2 of FIG. 1 showing cylindrical chamber 10 containing helical shaped resistance wire 14 having a noble metal plating 18 thereon.

In one form, as illustrated in the drawing, the apparatus of the invention includes a hollow cylindrical chamber 10 having openings 12 at the opposite ends thereof. In the chamber 10, secured by means 18 provided therefor, is a resistance wire 14 having a noble-metal plating 16 thereon to absorb any mercury vapor present in a volume of gas when said volume of gas is introduced through opening 12 of chamber 10. Means 20 are provided for connecting wire 14 to a power source 22 for direct resistance heating of wire 14 to the requisite desorbing temperature of the noble-metal to release the mercury collected on the noble-metal plating 16 during the passage of gas through chamber 10. Upon applying current, using power source 22, to wire 14 the mercury which has been collected on the noble-metal plating 16 is released to means provided for measurement thereof. It should be noted that it is equally sufficient to introduce a volume of air or other gases into the chamber 10 through either of openings 12 of chamber 10. Means for measurement of the released mercury is not shown in the drawing and can be accomplished by U.V. adsorption or other suitable conventional means.

As the chamber in the apparatus of the present invention various materials may be employed. For example, vycor, pyrex or any other insulating tubing that will not absorb mercury have been found to be suitable chambers. The size of the chamber is not critical and selection thereof will depend on convenience to the user and the environment in which the apparatus is to be utilized. Although it has been found that a chamber of about 4 to about 15 inches in length and 0.25 to about 1.0 inches in diameter is of convenient size, the only requirement for the size of the chamber is that the absorbent surface contained therein be exposed to the total volume of gases or air being passed therethrough. Therefore, it would reasonably be expected that a 1 foot diameter tube would not be employed with an absorbent material having a small surface area so as to allow passage of a great volume of gas therethrough which would not contact the absorbent. The size of the chamber is selected to give the greatest efficiency of absorption.

Suitable absorbent materials include various resistance wires plated with a noble-metal. Suitable wires include, 20–24 gauge nichrome wire, stainless steel, nickel or a wire of noble-metal itself of suitable thickness. The type and character of wire used in the present apparatus is chosen for its resistance to effect the required heating without the necessity of a large quantity of power to do so. It is preferably to use a nichrome wire plated with a noble-metal such as gold, silver and other noble-metals disclosed in the prior art for use as absorbents.

It has been found that using a plated wire which has been coiled gives a greater surface area for which to contact the gas passing therethrough, therefor increasing the efficiency of the operation. Further, the helical shape creates a spring tension which keeps the coiled wire from coming into contact with itself and the chamber.

It has further been found that a hollow plated wire used herein increases the efficiency of the process by requiring less area to heat therefore requiring less power to do so.

The thickness of the noble-metal coating is not critical because the process of sorption takes place on the surface thereof. The only requirement to give increased efficiency is to utilize as pure a noble-metal coating as is possible to obtain on the wire. Greater thicknesses do not increase the amount of mercury trapped thereon.

A suitable apparatus for employing the improved process would consist of an open ended vycor tube 7.5 inches long and 0.5 inches in diameter containing a 6 to 8 foot, 22 gauge, hollow, helical shaped nichrome wire of 6 ohm resistance having a pure gold plating thereon with said wire being connected to a source of electrical energy. The resistance of the wire employed can vary greatly depending on the amount of current available to be employed. Therefore, the environment in which the apparatus is to be employed dictates the specific selection of materials of construction. Various environments include airborne and vehicular operations which would have only a certain amount of available power to be utilized in operating the present apparatus.

The power needed to direct resistance heat the absorbent material can be supplied from any conventional power source which is available in the operating environment. It is a requirement that the noble-metal absorbent be heated to above the requisite desorbing temperature, which in the case of gold is about 450° C., at which time the trapped mercury is released therefrom for measurement by any suitable means. Thus, the time it takes for heating to the requisite temperature for mercury release will depend on the specific materials of construction selected.

It should be noted that the apparatus of the present invention could be incorporated into a multi-trap system whereby a continuous operation of collecting and measuring mercury content in air could be performed. Using two or more traps having one or more plated wires therein, valves for controlling the flow of air and mercury vapor, and a multi-contact switch on a suitable power supply, mercury vapor present in air or other gases would be continuously collected and subsequently measured. By alternating the power for resistance heating of the plated wire absorbent in the various traps in a multi-trap system with a suitable switch, some of the traps would be absorbing mercury vapor while others being heated would be desorbing. Suitable valves would be employed for directing the flow of gas through the traps and to exhaust after absorption, while the mercury desorbed would be directed to suitable measuring devices.

The following examples are shown to illustrate the effective operation of the improved process and apparatus as described herein. Further comparative data is presented to illustrate the efficiency of the present invention as compared to prior mercury traps used in the industry for prospecting for various mineral deposits.

EXAMPLE 1

A 16 foot, 22 gauge nichrome wire having coils 15 inches long with approximately 15 square inches of surface area was utilized as the resistance wire in the following described trap. A total of 0.14 grams of gold was plated on the surface of the nichrome wire and annealed by resistance heating to a very dull red, approximately 500° C. The produced coating was very adherent. The trapping of the wire mounted in a 13 mm I. D. vycor tube at flow rates of 5–10 liters/minute was greater than 75 percent. The nichrome wire had a resistance of approximately 12 ohms (reduced from about 15 ohms by the gold plating) and upon being heated to above 450° C. by 90–100 volts for 5 seconds completely desorbed all the mercury trapped on the surface. This wire and others equivalent thereto were used approximately 2,000 times over a 2 month period with no sign of deterioration in trapping efficiency or speed of desorption.

EXAMPLE 2

An 8 foot gold-plated nichrome wire of 6 ohms resistance was coiled and placed in a vycor tube 7.5 inches long and 0.50 inches in diameter. This apparatus was found to trap from 50–80 percent of the mercury in the air at flow rates of 5–10 liters/minute. The nichrome wire had a resistance of 6 ohms and upon being heated to above 450° C. by 40 volts for 7 seconds completely desorbed all the mercury trapped on the gold surface. This wire and others equivalent thereto were used for more than 2 months with very little deterioration in trapping efficiency or speed of desorption.

EXAMPLE 3

A 22 mm I. D. × 6 inches long vycor tube containing four gold plated, 22 gauge nichrome wires was assembled. The parallel, gold plated, 4-ohm wires in the tube were heated to above 450° C. by 24 volts at about 24 amps for 5.0 seconds to completely desorb the trapped mercury. The trapping of this unit was better than 20 percent at flow rates of 5,000–6,000 feet/minute measured at a 1.0 inch orifice.

Comparative Data

| | |
|---|---|
| Gold foil trap | 1.0 inch diameter tube 7.5 inches long<br>1/8 inch strips<br>30 grams of 5 mil foil<br>linear velocity of 3000 feet/minute<br>trapping efficiency 18–22% |
| 1 wire trap | 0.5 inch diameter tube 7.5 inches long<br>1 coiled 8 foot long gold plated 22 gauge nichrome wire .025 inches in diameter<br>0.20 grams of gold<br>linear velocity of 3000 feet/minute<br>trapping efficiency 40–60% |
| 4 wire trap | 1.0 inch diameter tube 7.5 inches long<br>4 coiled 5 foot long gold plated 22 gauge nichrome wire .025 inches in diameter<br>>1.0 grams of gold total<br>linear velocity 3000 feet/minute<br>trapping efficiency 20–30% |

Having thus described the invention, I claim:

1. In a process for collecting and measuring the amount of mercury vapor present in a volume of gases with a mercury trap having a noble-metal absorbent, wherein said volume of gas is passed through said trap and the mercury vapor present therein is absorbed by said noble-metal and heat is subsequently applied to said noble-metal to desorb the collected mercury for measurement, the improvement comprising direct resistance heating of said noble-metal to release said mercury for measurement thereof.

2. The improvement of claim 1 wherein said noble-metal having mercury collected thereon is resistance heated to a temperature above 450° C.

3. An apparatus for collecting mercury vapor from a volume of gases for the subsequent measurement thereof which comprises:

a hollow chamber having an opening at opposite ends thereof, a resistance wire having a noble-metal plating thereon secured by means therefor in said chamber for the absorption on said noble-metal plating of mercury vapor present in a gas passed therethrough, means for connecting said resistance wire to a power source for direct resistance heating thereof, and means for collecting mercury desorbed when said means for resistance heating is activated.

4. The apparatus of claim 3 wherein the noble-metal plated on said wire is gold.

5. The apparatus of claim 3 wherein said plated wire is helical in shape.

6. The apparatus of claim 3 wherein said plated wire is hollow.

* * * * *